(12) United States Patent
Bozchalooi et al.

(10) Patent No.: US 10,649,072 B2
(45) Date of Patent: May 12, 2020

(54) LIDAR DEVICE BASED ON SCANNING MIRRORS ARRAY AND MULTI-FREQUENCY LASER MODULATION

(71) Applicant: Massachusetts Institute of Technology, Cambridge, MA (US)

(72) Inventors: Iman Soltani Bozchalooi, Chelsea, MA (US); Kamal Youcef-Toumi, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 374 days.

(21) Appl. No.: 15/591,593

(22) Filed: May 10, 2017

(65) Prior Publication Data

US 2018/0329037 A1 Nov. 15, 2018

(51) Int. Cl.

| | |
|---|---|
| *G01S 7/481* | (2006.01) |
| *G01S 17/08* | (2006.01) |
| *G01S 17/42* | (2006.01) |
| *G01S 17/26* | (2020.01) |
| *G01S 17/931* | (2020.01) |
| *G01S 13/931* | (2020.01) |

(52) U.S. Cl.
CPC .......... *G01S 7/4817* (2013.01); *G01S 7/4815* (2013.01); *G01S 7/4816* (2013.01); *G01S 17/26* (2020.01); *G01S 17/42* (2013.01); *G01S 17/931* (2020.01); *G01S 2013/93277* (2020.01)

(58) Field of Classification Search
CPC ...... G01S 7/4817; G01S 17/102; G01S 17/42; G01S 7/4815; G01S 7/4816; G01S 17/936; G01S 2013/9396; G01S 17/26; G01S 17/931; G01S 2013/93277

USPC .......................................... 356/4.01
See application file for complete search history.

(56) References Cited

U.S. PATENT DOCUMENTS

| | | | | |
|---|---|---|---|---|
| 3,840,293 A | * | 10/1974 | Fine .................. | G01S 7/4811 359/224.1 |
| 4,684,950 A | * | 8/1987 | Long ................. | G01S 13/524 342/159 |

(Continued)

OTHER PUBLICATIONS

Kurth et al, A novel 24 kHz resonant scanner for high resolution laser display. MOEMS Display and Imaging Systems III, 2005.

(Continued)

*Primary Examiner* — Daniel L Murphy
(74) *Attorney, Agent, or Firm* — Smith Baluch LLP

(57) ABSTRACT

A LiDAR device that transmits a single or multiple continuous or intermittent laser beams to the environment and detects the reflected light on one or more detectors. The LiDAR device may include a scanning mirrors array composed of a single or multiple moving mirrors capable of changing the direction of the transmitted light. The scanning mirrors array may also include sensors and actuators which can be used to precisely control or measure the position of the mirrors. The LiDAR device may also include a lens that focuses the light captured by the mirror(s) onto a single or a multitude of detectors. The device may include laser sources and detectors operating in various wavelengths. The LiDAR device may also include laser power modulation mechanisms at a single or multitude of frequencies to improve signal detection performance and remove any ambiguity in range calculation.

24 Claims, 14 Drawing Sheets

(56) References Cited

U.S. PATENT DOCUMENTS

| | | | | |
|---|---|---|---|---|
| 4,834,531 A * | 5/1989 | Ward | ............... | B64G 1/646 |
| | | | | 244/172.4 |
| 5,543,956 A | 8/1996 | Nakagawa | | |
| 8,836,922 B1 | 9/2014 | Pennecot et al. | | |
| 2001/0048784 A1* | 12/2001 | Behin | ............... | B81B 3/0021 |
| | | | | 385/18 |
| 2003/0001955 A1* | 1/2003 | Holz | ............... | G01S 17/936 |
| | | | | 348/148 |
| 2010/0208235 A1* | 8/2010 | Kaehler | ............... | G01S 7/4812 |
| | | | | 356/5.01 |
| 2011/0216304 A1 | 9/2011 | Hall | | |
| 2013/0192342 A1* | 8/2013 | Kallio | ............... | G01S 17/95 |
| | | | | 73/29.02 |
| 2014/0153001 A1* | 6/2014 | Chayat | ............... | G01S 17/89 |
| | | | | 356/612 |
| 2015/0293218 A1* | 10/2015 | Protz | ............... | H01Q 19/19 |
| | | | | 342/52 |
| 2016/0139266 A1* | 5/2016 | Montoya | ............... | G01S 17/32 |
| | | | | 356/5.01 |

OTHER PUBLICATIONS

Lau, Narrow-Band Modulation of Semiconductor Lasers at Millimeter Wave Frequencies (> 100 GHz) by Mode Locking. IEEE Journal of quantum electronics, 1990, vol. 26. No. 2.

Wehr et al. Airborne laser scanning—an introduction and overview, ISPRS Journal of Photogrammetry & Remote Sensing, 1999, p. 68-82, vol. 54.

* cited by examiner

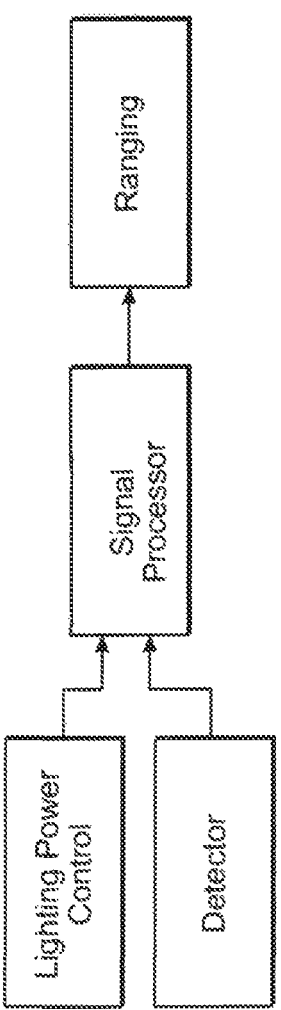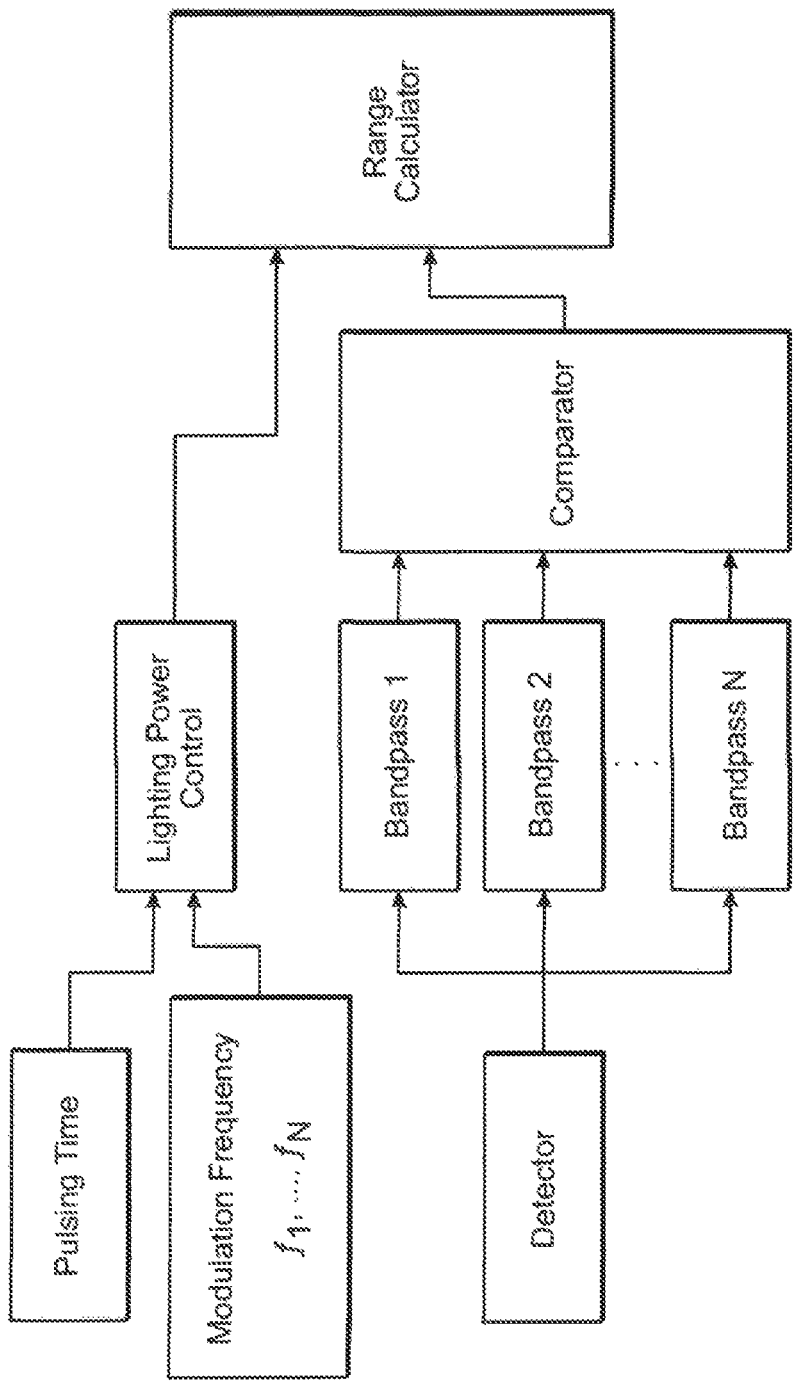
FIG. 15A
FIG. 15B

LIDAR DEVICE BASED ON SCANNING MIRRORS ARRAY AND MULTI-FREQUENCY LASER MODULATION

BACKGROUND OF THE INVENTION

Accurate knowledge of the environment such as shape, color, distance and arrangement of various objects in the surroundings can be useful in robotic applications, aerial or underwater vehicles or autonomous driving. Of the multiple sensing options in such applications, light detection and ranging devices (LiDARs) have certain advantages, e.g., resolution, range and precision. A LiDAR can estimate the distance to or geometric features of surroundings on a point by point basis to form a point cloud of reachable or visible objects. To measure points in the cloud, individual pulses of light can be projected onto various objects and the associated time of flight (time between the transmission of light and the detection of the reflection) can be estimated. To cover the area of interest in the environment and form a point cloud, pulses of light can be issued repeatedly in various directions. The orientation of the projected laser and the measured time of flight (TOF) can be used to assign a spatial location to every observed point in the 3-dimensional space. In a similar fashion power of the emitted light can be modulated and the phase lag between the detected and emitted light can be used instead of TOF for distance estimation.

In many applications including autonomous driving, increasing the point cloud density can be very helpful in various tasks such as mapping, localization and perception. However, the point cloud density in state of the art LiDARs such as in [1, 2] is often very low due to a limited number of laser sources and, similarly, a limited number of detectors. Given the space and cost constraints there is often a limited number of laser diodes and detectors that can be accommodated in a LiDAR system. The necessity to include a multitude of sensors and light sources is in part due to optical design and signal detection requirements. Eye safety, energy consumption and also operating temperature requirements limit acceptable laser power. Low laser power, limited detection dynamic range and short duration of laser pulses combined with often very weak diffusive reflection off the majority of surfaces make detection of reflected light very challenging. This challenge is even greater in outdoor applications where background lighting can undermine detectability of reflected light. As such, it is very important to capture as much light as possible to increase the detectability of the reflected light. This is often done by using relatively large lenses. However, large lenses feature large focal distance and hence have a very limited field of view. As such, to accommodate an acceptable field of view, e.g., 20-30 degrees, one needs to use multiple sensors placed far apart in the lens focal plane. A common and effective design is to assign a laser diode with proper orientation to each and every detector. Another reason justifying the application of multiple laser sources is rooted in the limitations of laser pulsing rate. In state of the art LiDAR systems each laser diode is capable of generating 10 to 20 thousand pulses per second at relatively high laser power due to the associated temperature rise. Such a pulsing rate is not sufficient for building dense point clouds at a reasonable frame/sweep rate relevant to applications such as autonomous driving or high speed robotics, etc. As such, application of multiple laser sources would help to increase the pulsing rate beyond that provided by a single light source. The requirement for unambiguous detection of reflected light further limits the feasible pulsing rate. For a single pair of light source and detector, issuance of new pulses should be delayed until the reflection(s) associated with the latest pulse is (are) measured. Otherwise it would be unclear as to which reflection corresponds to which of the emitted past light pulses. As an example for a 300 m detection range the consecutive pulses should be at least 2 µs apart for unambiguous estimation of time-of-flight (TOF). By assigning a single laser source to every detector and applying a multitude of such pairs this limitation can also be side-stepped. Although application of multiple laser sources and multiple sensors is feasible, it brings about severe cost and resolution constraints and limits the capabilities of LiDARs.

The present invention addresses these limitations of the prior art by applying an array of scanning mirrors. This invention further uses modulation of wavelength or intensity of projected light to enable unambiguous estimation of TOF or phase lag for dense depth map formation using a minimal number of light sources and detectors all fitted in a small package.

SUMMARY OF THE INVENTION

In one embodiment of this invention a light detection and ranging system is presented that features a housing containing one or multiple scanning mirrors arranged in the form of a one or two dimensional array hereafter referred to as the scanning mirrors array (SMA). The LiDAR system may further include a single or a multitude of light sources for light projection and a single or a multitude of detectors for light detection. The multitude of scanning mirrors forming an array or a matrix work together to vary the direction of light projection and simultaneously vary the viewing direction of the detectors to maximize the capture of reflecting light. The reflected light is then processed to acquire information about the environment such as distance, shape, material properties or motion of various objects.

In one embodiment the scanning mirrors array (SMA) is designed such that every mirror can only rotate about a single axis of rotation common to all other mirrors hereafter referred to as a 1D scanning mirrors array. In this form the scanning mirrors array can provide a one dimensional light scan, e.g., to cover a line or a curvature in the space. In another example the scanning mirrors array is designed such that every mirror component can rotate about two different axes simultaneously. In this form the scanning mirrors can cover a two dimensional area to project light and to capture the reflection. This design is hereafter referred to as a 2D scanning mirrors array.

In one embodiment the LiDAR device with a stationary housing includes a single light source to generate continuous waves or discontinuous pulses of light. It also includes a single projection lens that captures and collimates the projection light. A collimation stage aims to adjust the divergence of emitted light in a suitable fashion in order to maximize the detection range. The light source generates light at a single or a plurality of wavelengths suitable for light detection and ranging in various environmental conditions such as night, day, rain or fog. The light wavelengths can be switched to suitable values as the environmental conditions vary. At least part of the light pathway in the LiDAR setup is shared between the projection and detection portions of the LiDAR. The projection light is guided to the shared pathway via a stationary mirror placed at a suitable angle with respect to the direction of the light emitted by the light source. This stationary mirror enables placement of the light source outside the shared detection/projection pathway.

The projection light is then directed to the objects in the environment via a scanning mirrors array containing a multitude of moving mirror components. The reflected light is captured in the same direction by the same multitude of scanning mirrors and directed towards a lens hereafter referred to as the detection lens that focuses the incoming reflected beams of light onto one or a multitude of detectors.

In an example where a 2D scanning mirrors array is applied a horizontal and a vertical field of view can be achieved. In a case where a 1D scanning mirror is applied only a line can be scanned in the environment. As such, in practice one needs to move the 1D scan line in a second direction, e.g., perpendicular to the scan line to cover a scan area. The LiDAR device may feature a rotating housing to provide a 360-degree field of view in one direction (e.g., horizontal) while an arrangement of scanning mirrors array as discussed above provides a limited field of view in other directions (e.g., vertical, horizontal or a combination of the two). Another possibility is to rotate a single or a multitude of optical components, e.g., a monolithic mirror or one of multiple of the scanning mirrors array instead of the whole housing.

In another example, a 2D scan area can be achieved by combining two 1D scanning mirrors arrays where one is placed up/down stream from another one. In this form one of the two scanning mirrors arrays provides a horizontal (vertical) scan of the environment while the secondary scanning mirror array provides a vertical (horizontal) scan of the environment. When working together these scanning mirrors generate fields of view in both vertical and horizontal directions.

The LiDAR device may include a single light source to generate continuous waves or discontinuous pulses of light. The generated light is captured and collimated via a single lens. The collimated light is then guided to a shared transmission/detection pathway via a single stationary mirror placed at a suitable angle with respect to the direction of the light emitted by the light source. The angle of the emitted light is then modulated at high speed by an array of scanning mirrors towards either the environment or a secondary monolithic stationary mirror placed at a suitable angle. The array of scanning mirrors may provide a limited field of view only in one direction (e.g., vertical) while the rotation of the LiDAR or certain components thereof about another axis provides a 360-degree field of view in another direction (e.g., horizontal). The array of scanning mirror may also provide a limited field of view in both vertical and horizontal directions by scanning the light in two independent directions, e.g., horizontal and vertical directions. The light can then be captured from the environment by the same scanning mirrors array upon reflection and guided to a detection lens. The LiDAR may include a single or a multitude of detection lens to capture and focus the reflected light on to a single or a multitude of detectors for further processing.

In another example the LiDAR device includes all the components and features of the previous example with slight modifications. In this example the scanning mirrors array can be reflective on both sides to support two replicas of the light detection and ranging device placed in opposite directions. In this form one replica covers a frontal view while the secondary replica provides a rear view to increase the scanning throughput by a factor of two.

This invention further includes techniques for unambiguous detection and processing of light reflections for high-rate and dense-point-cloud formation and for large-detection-ranges. In one example the power of emitted light is modulated over a range of frequencies. The range of applied frequencies are dependent on the required maximum pulsing rate and the expected maximum detection range. The emitted light intensity can form a continuous wave featuring a modulated frequency or a discontinuous series of light pulses resembling a wavelet each featuring a specific modulation frequency. As such, the frequency signature of the reflecting light determines the timing of the corresponding light emission and the TOF associated with every detected reflection can be estimated without any ambiguity. Another benefit of modulating the light intensity at known frequencies is the significant reduction of the background noises in daylight when sunlight interferences can be substantial or harsh weather conditions where intensity of reflected light is very low (i.e., low detection SNR).

In another example the wavelength of the emitted light can be modulated over time. In this form bandpass optical filters can be used to guide the emitted lights of various wavelengths to specific detectors and hence to remove any ambiguity in detection and ranging.

In the following we clarify various features, aspects, characteristics and the associated advantages of the invention to those with ordinary skill in the art through detailed descriptions and when necessary with reference to figures.

BRIEF DESCRIPTION OF THE DRAWING

FIG. 13 b) is an example application where the LiDAR device steers a turn for efficient illumination.

FIG. 13 c) is an example application of the LiDAR device where the lighting intensity and wavelength is adjusted to the environment according the angular position of the housing or the instantaneous angle of the scanning mirror components.

FIG. 13 *d*) is an example application of the LiDAR device where in addition to ranging, it is used as a high throughput and robust means of communication between the vehicles.

FIG. 14 *b*) shows the power modulation curve for the LiDAR device presented in this invention.

FIG. 15 *a*) shows a general flowchart of the proposed Light Transmission and Detection module (LTD).

FIG. 15 *b*) is an example flowchart of the light transmission and detection module featuring a bank of bandpass filters and comparators.

DESCRIPTION OF THE PREFERRED EMBODIMENT

The LiDAR device according to this invention may include a single or a multitude of light sources, and a single or a multitude of detectors. By projecting continuous waves or discontinuous light pulses onto various objects and measuring certain features of the reflected light, e.g., time of flight (TOF) or phase lag with respect to the projected light one can estimate the distance of various objects in the environment and form a point cloud of the surroundings. Such information can be very useful in various applications such as autonomous driving and robotics. State of the art designs of LiDARs are often very limited in terms of data throughput and resolution. Furthermore, due to a need for multiple detectors and light sources the design and calibration can be complex and the associated manufacturing cost can be very high. Furthermore, such designs often leave very limited room for flexibility and on the fly tuning/changing of various characteristics of the instrument such as wavelength of the projected light(s), field of view, resolution, etc as such characteristics are often fixed upon fabrication.

This invention tackles such limitations of the state of the art by 1) applying an array of scanning mirrors operating synchronously to project light in continuously varying directions and guiding the reflected light to a minimum number of detectors such as a single detector, and 2) modulating the power or wavelength of the emitted light in order to unambiguously estimate the range of various objects residing at far (>300 m) as well as close distances (<1 m).

Details of this invention are disclosed in the following with reference to figures that reflect certain embodiments of the presented invention. These illustrative embodiments are meant for description and clarification purposes and do not aim to be limiting. It may be obvious to those skilled in the art that different aspects of the discussed invention can be re-arranged or combined in various configurations which may not be particularly discussed but all of which are contemplated herein.

Figure 1:
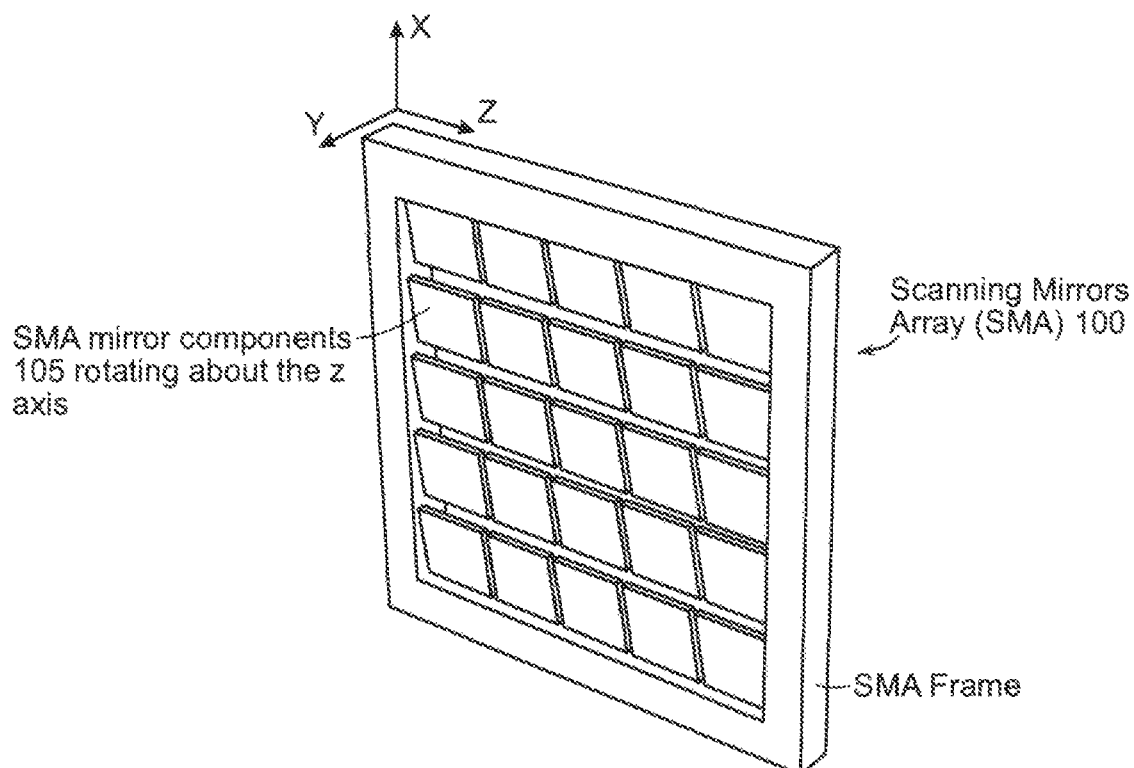
FIG. 1 is a perspective view of a two dimensional scanning mirrors array composed of several smaller mirrors capable of rotating about one or two independent axes.
Figure 2:
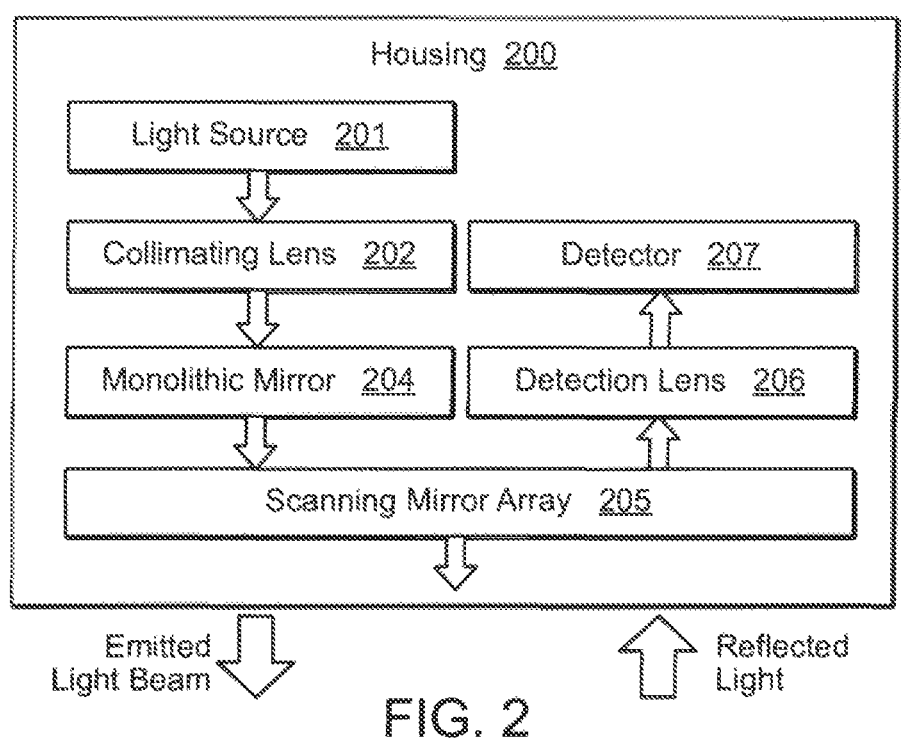
FIG. 2 is a flowchart of one embodiment of a LiDAR system according to the invention.

FIG. 1 shows a scanning mirrors array (SMA) 100 composed of several smaller mirror components 105 that are capable of rotating about a single or multiple axes. A block diagram of an example embodiment of the invention is shown in FIG. 2 where a LiDAR device includes a housing 200 that contains one such scanning mirrors array (SMA) 205 along with other components as discussed in the following. In this embodiment the housing further includes a light source 201 which generates a continuous wave or discontinuous pulses of light. The emitted light is then captured and collimated by a collimating lens 202. The collimation in this context refers to reduction of the divergence angle of the emitted light to approximate a parallel beam of light. The resulting divergence angle of light and the initial light beam width are adjusted to maximize the detection range and the detection resolution. The collimated light is then guided towards a monolithic mirror 204 placed at a suitable angle with respect to the incoming light so that the reflected light beam is guided towards a scanning mirrors array (SMA) 205. The scanning mirrors array 205 then guides the collimated light beam towards objects in the environment. The light reflected by objects in the environment is further captured by the SMA and guided towards a detection lens 206 which focuses the reflected light on a detector 207. The number of mirrors included in the SMA are selected to provide large enough aperture for maximal light capture and for best detection performance.

Figure 3:
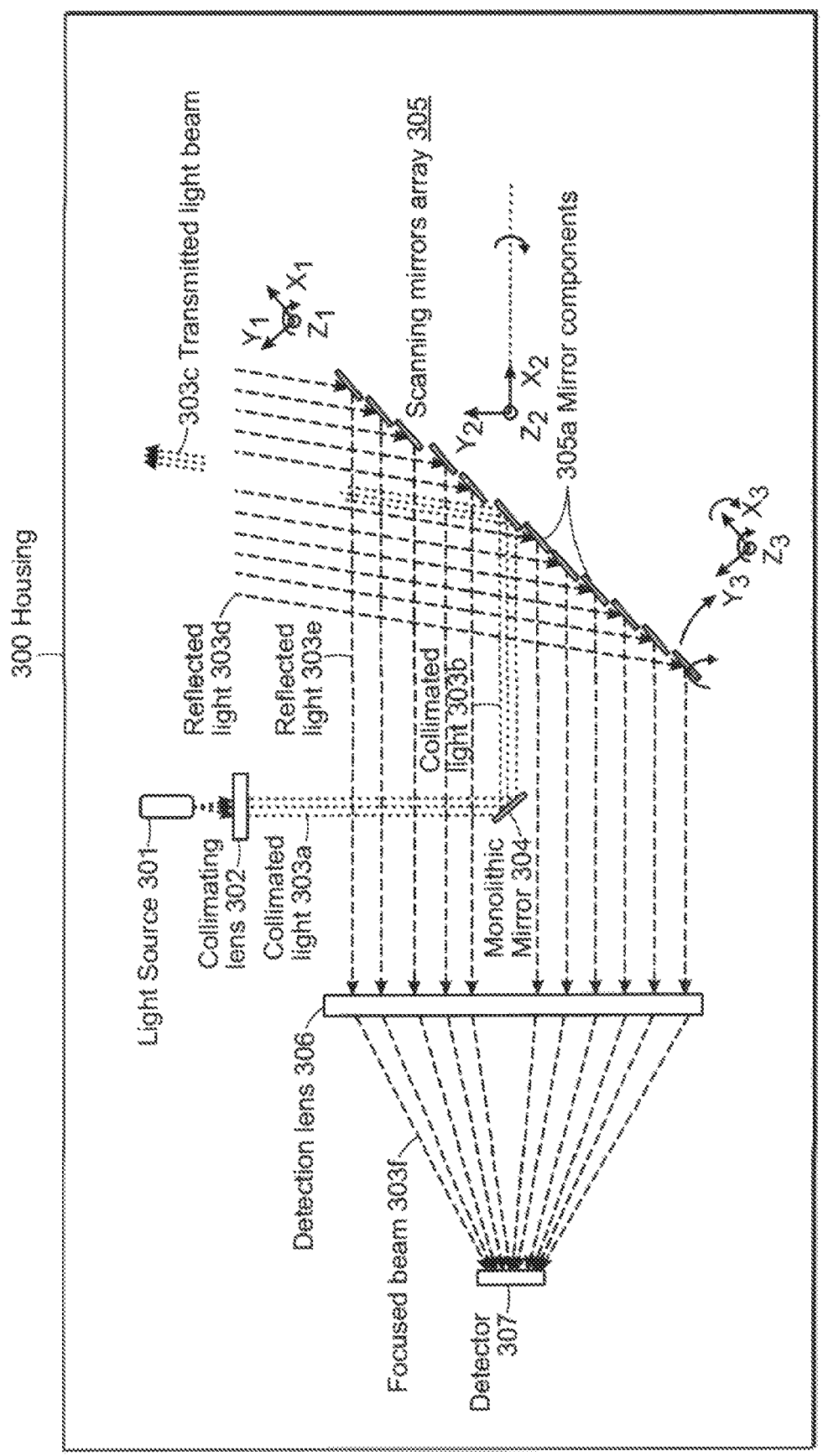
FIG. 3 is a schematic illustration of an embodiment of a LiDAR system featuring a single one-sided SMA.

This embodiment can be further understood with reference to FIG. 3 which reflects a more specific embodiment of the block diagram of FIG. 2. As shown in this figure the light emitted by the light source 301 is collimated by a collimating lens 302. The collimated light beam 303*a* is then directed towards a monolithic mirror 304 placed at a suitable angle with respect to the incoming light to guide the collimated light beam 303*a* towards a scanning mirror array 305.

In some examples, the mirror 304 can be placed at a 45-degree angle with respect to the collimated light beam such that the reflected light 303*b* is guided towards a scanning mirror array 305 in parallel with the optical axis of a detection lens 306. The mirror components of the SMA 305 such as component 305*a* are able to rotate or oscillate about different axes. In the example as shown in FIG. 3 the mirror components 305*a* of the SMA 305 can oscillate about an axis perpendicular to the figure plane denoted by $Z_1$. The light beam 303*b* is reflected by a single or a multitude of mirror components (305*a*) of the scanning mirrors array (SMA) 305 in a direction determined by the instantaneous angle of rotation/oscillation of the scanning mirror component(s) of the SMA 305. The mirror components 305*a* of the SMA 305 operate synchronously and are controlled to feature approximately equal instantaneous rotation/oscillation angles. Achieving perfectly equal instantaneous rotation/oscillation angles, e.g., equal oscillation amplitude for all the components may not be practical. However, it is understood that slight variations between the instantaneous angles of the mirror components 305*a* can be accommodated as explained herein. The transmitted light beam 303*c* is guided towards the surrounding objects. Upon incidence with an object, part of the transmitted light beam 303*c* is reflected back towards the LiDAR in the same direction as the initially transmitted light beam 303*c*. As such, this light can be picked up by the mirror components 305*a* of the SMA 305 and guided in parallel with the optical axis of the detection lens 306 towards to the same. As the light beam 303*e* is parallel with the optical axis of the detection lens 306 regardless of the instantaneous angle of rotation of the SMA mirror components, the detection lens 306 focuses the reflection beam 303*e* towards its focal point where a detector 307 is placed. Slight deviations of the captured laser light reflection from a parallel line (with respect to the optical axis of the detection lens) can also be accommodated by adopting a detector with slightly larger detection area. As often the majority of light 303*d* is reflected from objects under diffusive regime it does not feature a narrow beam width similar to the initially projected collimated beam 303*b*. As a result, to capture a larger portion of the reflected light a multitude of scanning mirrors are utilized in this embodiment to form a scanning mirrors array (SMA).

By using several smaller mirror components 305*a* it is possible to change their instantaneous angle at very high speed. The variation rate of the instantaneous angle of the mirror components 305*a* is one factor that determines the scan speed of the LiDAR. While individual components 305a are capable of scanning the environment at high-speed due to their small size and design, by combining several such small components one can also collect a large amount of reflected light from the environment and hence improve detection performance in adverse conditions, e.g., for very low reflective surfaces or in the presence of strong background interference. As mentioned earlier it is often difficult to ensure that the instantaneous angle of the all the mirror components 305a are equal at all times. However, it is understood that slight variations can be accommodated in this design by adopting a larger detector 307. This is because variations of the instantaneous angles among the mirror components 305a result in dispersion of the focused light 303f on a larger area on the detector 307. The smaller the discrepancy between the instantaneous rotation angles of various mirror components 305a, the smaller this dispersion effect will be. It is also understood that in this design at least part of the detection and transmission light paths are shared. This co-axial transmission and detection removes limitations associated with a parallax problem. However, it is noted that the monolithic mirror 304 at least partly blocks the reflected light from reaching the detector 307. Hence, it is preferred to adopt a small diameter for the collimated light beam 303a and consequently a smaller size for the monolithic mirror 304.

Various actuation, sensing and control strategies can be adopted for the scanning mirror array (SMA) unit 305. The individual mirror components can be driven via electrostatic, electromagnetic, piezoelectric or magnetostrictive forces, etc. Similarly sensing can be achieved via optical, piezo-electric, piezo-resistive, or electromagnetic means, etc. In one embodiment the individual mirror components 305a of the SMA 305 can operate as resonance scanners oscillating about a stable angular point at the resonance frequency of the base structure where the mirrors are placed. In this form the scanning mirror components can only operate at or near a resonance frequency. In another example a galvo-scanner or other similar scanners with controllable rate and position can be adopted.

In one embodiment of FIG. 3 the mirror components 305a of the SMA 305 can rotate only about a single axis denoted in this Figure as $Z_1$ in a local coordinate system $X_1Y_1Z_1$. In this form the light beam projected on the objects in the environment can only be scanned along a three dimensional line/curvature. As such, to scan an area one more degree of freedom should be provided by another moving component such as the SMA 305 as further detailed in the following.

In one embodiment of the arrangement shown in FIG. 3 to enable area scan, the SMA may be rotated fully (360 degrees) or partially about a secondary axis. In one example the rotation axis can be parallel with the projected light beam 303b denoted as $X_2$.

In another embodiment the housing 300 and all the included components can be rotated about a secondary axis such as the horizontal axis $X_2$. In this form proper balancing of the components is needed to avoid large unbalanced forces and vibrations at high rotation speeds.

It is understood that in the latter two embodiments the field of view of the LiDAR device along one direction is determined by the rotation/oscillation angle of the mirror components 305a and along another direction is determined by the rotation angle of the whole SMA 305 or the housing 300.

In another embodiment of FIG. 3, area scan of the objects in the environment can be achieved by rotating the individual mirror components 305a about two independent axes such as $Z_3$ and $X_3$. It is understood that in this embodiment the field of view of the LiDAR device is determined by the rotation/oscillation angle of the mirror components 305a about the $Z_3$ and the $X_3$ axes.

Figure 4:
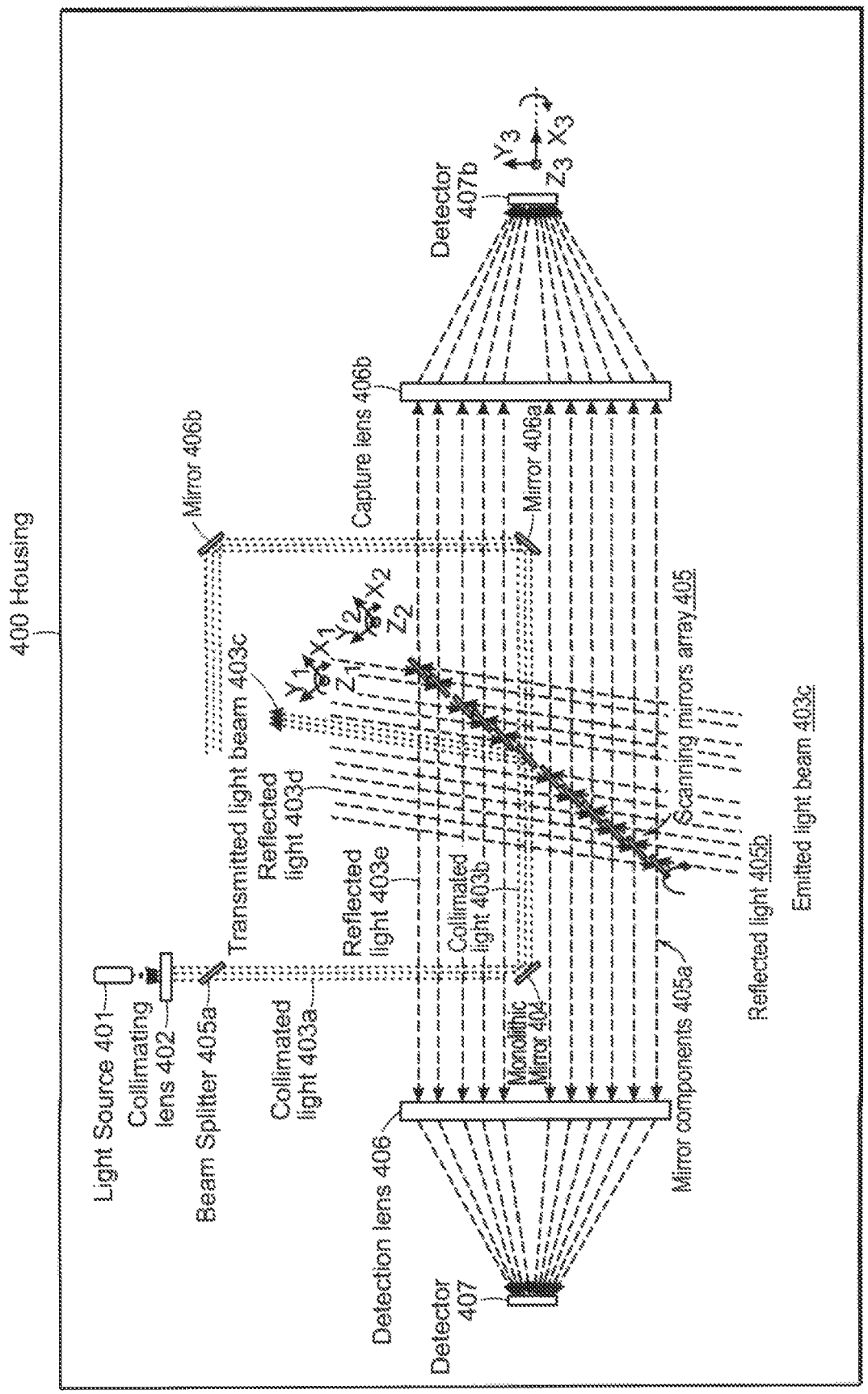
FIG. 4 is a schematic illustration of an embodiment of a LiDAR system featuring a double sided SMA.

An embodiment of the invention is shown in FIG. 4 where a two sided SMA 405 is either composed of two sided mirror components 405a or is a back-to-back combination of two single sided SMA units similar to that shown in FIG. 3. In this embodiment two replicas of the detection setup of FIG. 3 can work together to provide a two-fold increase in sensing throughput. In this form a single light source can be used along with a beam splitter 408a which splits the emitted light into two separate paths towards the two sides of the SMA 405. As in the embodiment of FIG. 3 in a case where the mirror components 405a of the SMA 405 can only rotate about a single axis such as $Z_1$ (denoted in the figure), a line or curve scan of the environment can be achieved. To enable surface scan, the mirror components 405a can be rotated about two separate axes, for example, about $Z_3$ and $X_3$ as shown in the figure. In this form, the field of view of the LiDAR device in each direction is determined by the maximum rotation angle of the mirror components about the corresponding axis. To achieve surface scan of the environment it is also possible to rotate either the SMA 405 alone or the housing 400, with all the enclosed components, about an axis such as $X_2$ shown in FIG. 4. In one example, the rotation axis $X_2$ can be selected to be parallel with the optical axis of the two detection lenses 406 and 406R.

Figure 5:
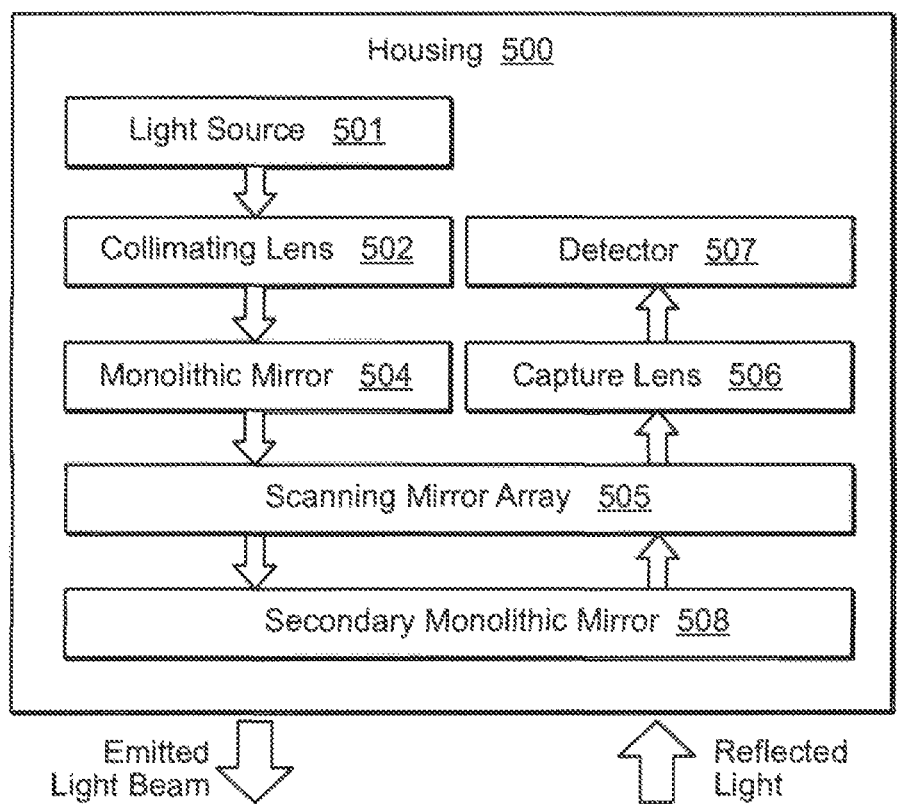
FIG. 5 is a flowchart of a LiDAR system including a single SMA cascaded with a monolithic mirror.
Figure 6:
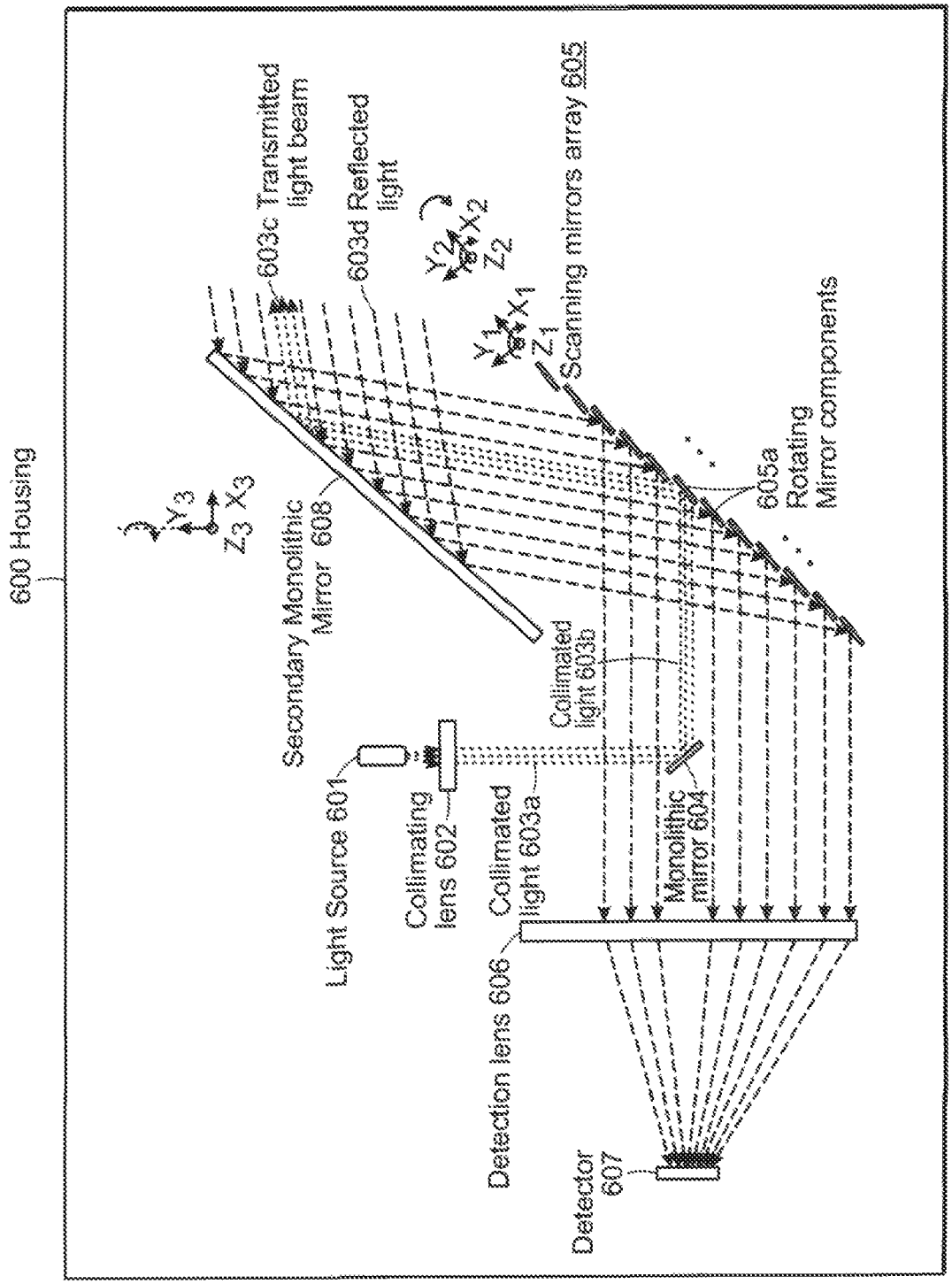
FIG. 6 is a view of an embodiment of a LiDAR system including a single SMA cascaded with a monolithic mirror.

In certain cases it might be preferred to maintain the scanning mirrors array (SMA) stationary as a whole while the corresponding mirror components rotate about a single or multiple axes. In such cases it is possible to use a secondary monolithic mirror to project the collimated light onto the environment and guide the reflected light back to the SMA. FIG. 5 is a flowchart associated with one such embodiment. FIG. 6 illustrates one example of this embodiment where a monolithic secondary mirror 608 is used to project the collimated light 603b onto the environment. In this embodiment the SMA mirror components 605a may have a single degree of freedom, rotating about a single axis, e.g., $Z_1$, or each may have two degrees of freedom rotating about two axes $Z_3$ and $X_3$. In the former case the transmitted light beam 603c can follow a line/curve. To achieve a surface scan the secondary monolithic mirror can be rotated about an axis. In one example this rotation axes can be perpendicular to the optical axis of the detection lens 606 which in FIG. 6 is denoted as $Y_2$. It is understood that in this form the field of view in one direction is determined by the maximum rotation angle of the SMA mirror components and in another direction can potentially be 360 degrees for a case where the secondary monolithic mirror 608 makes full rotations about the axis $Y_2$. In a variation of this embodiment the secondary monolithic mirror 608 can be a two sided mirror. In this form a replica of the LiDAR device can utilize the back side of the mirror to double the detection throughput of the instrument.

Figure 7:
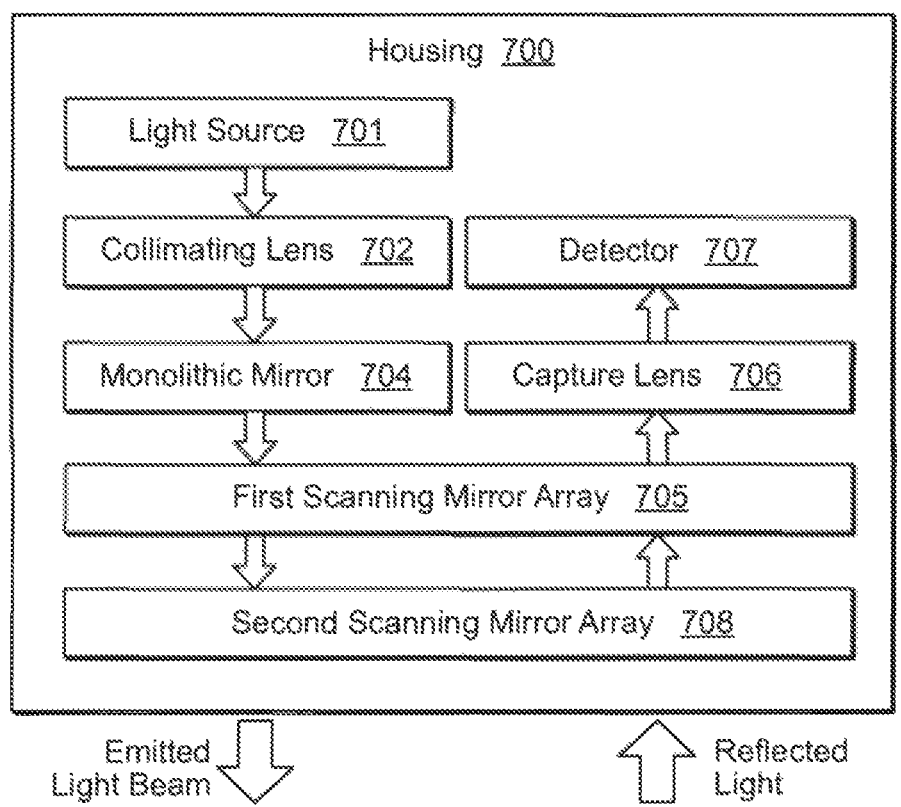
FIG. 7 is a flowchart of a LiDAR device including two cascaded SMA units.
Figure 8:
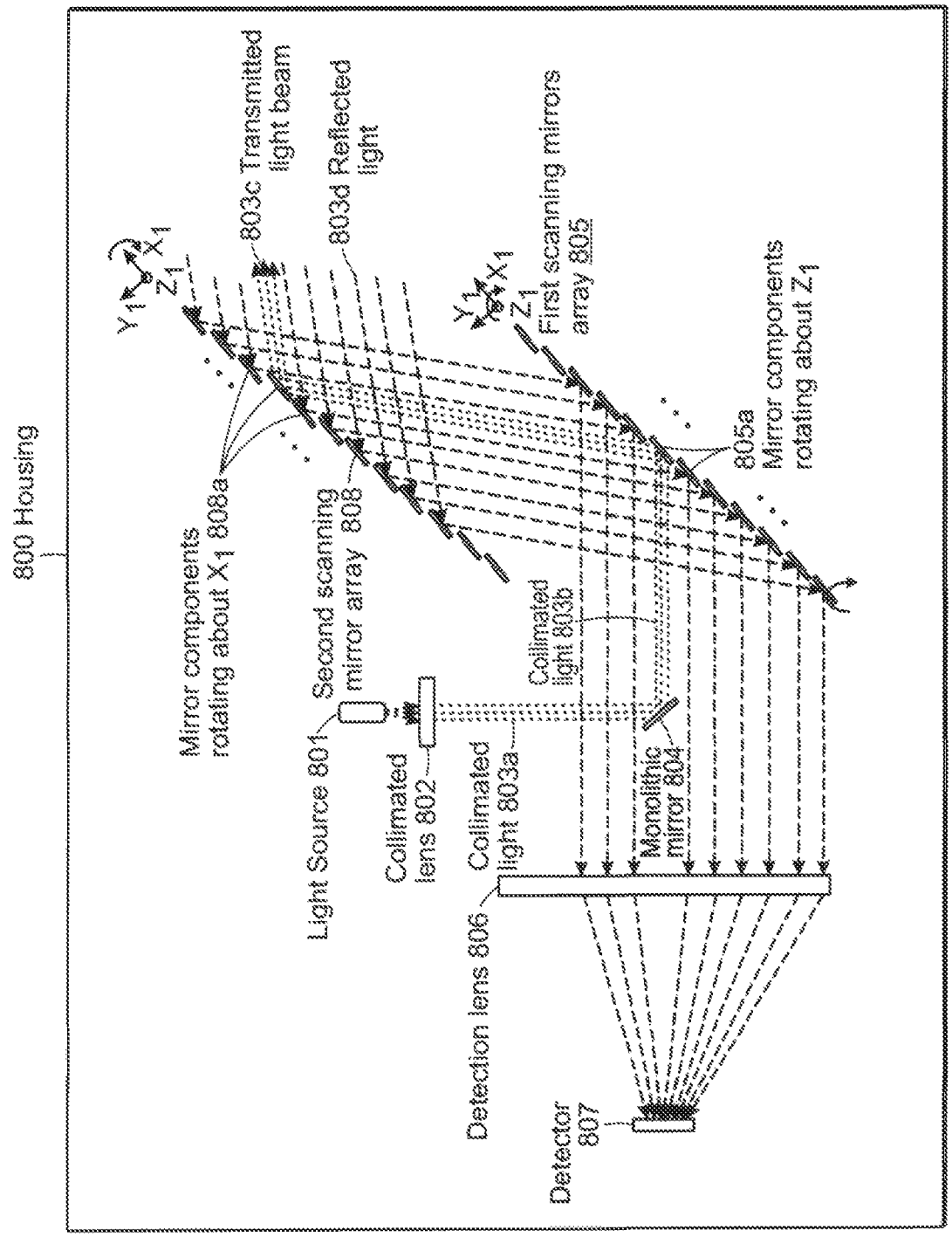
FIG. 8 is a view of an embodiment of a LiDAR device including two cascaded SMA units.

In another embodiment, to achieve an area scan, two separate scanning mirrors arrays (SMAs) can be cascaded wherein each mirror component rotates about a single axis. A flowchart associated with this embodiment is shown in FIG. 7. FIG. 8 illustrates one example of this embodiment where, in a first SMA 805, the mirror components 805a rotate about axis $Z_1$ and in a second SMA 808 the mirror components 808a rotate about axis $X_4$. It is understood that in this form the field of view of the LiDAR device on each direction is determined by the maximum rotation angle of the corresponding SMA mirror components.

Figure 9:
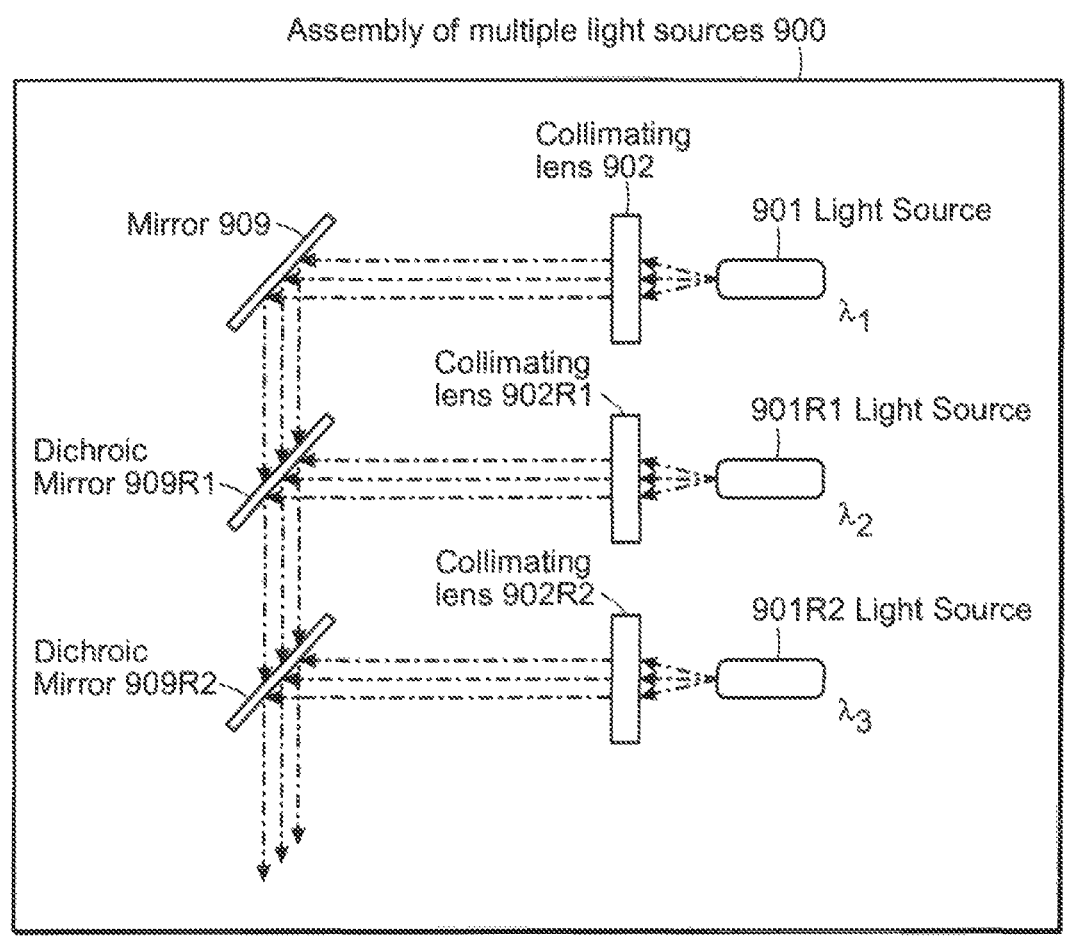
FIG. 9 is an example assembly of multiple light sources each featuring a single or a range of light wavelengths.

In some applications it is preferred to operate the LiDAR device on different wavelengths of light. To enable the LiDAR device to change the transmitted light wavelength one can adopt various arrangements. In one example it is possible to use tunable light sources such as tunable laser sources which are capable of generating light at different wavelengths. In another example it is possible to apply multiple light sources each operating at a single wavelength or each operating at a range of wavelengths. It is possible to replace the single light source with multiple light sources coupled into a single path using several dichroic mirrors, e.g., shortpass, longpass or bandpass, each targeting a specific wavelength of light. An example of one such arrangement is shown in FIG. 9. In this example three light sources, 901, 901R1 and 901R2 are used, featuring wavelengths of $\lambda_1$, $\lambda_2$ and $\lambda_3$, respectively. The Dichroic mirror 909R1 is reflective to wavelength $\lambda_2$ but transparent to wavelength $\lambda_1$. Similarly the dichroic mirror 909R2 is reflective to wavelength $\lambda_3$ but transparent to wavelengths $\lambda_1$ and $\lambda_2$. This arrangement can be extended to any number of light sources. The assembly 900 can replace the light source in any of the embodiments discussed earlier. In this form it is possible to trigger any of the light sources upon request. In one example the transmitted light wavelength can be a function of transmission light angle. For example it might be preferred to use a certain light wavelength on certain objects that is different from that projected on other objects in the environment. In this case various light sources can be triggered as a function of the angle of the transmission light, e.g., by the angle of the scanning mirror components or the rotation angle of the housing, etc.

Figure 10:
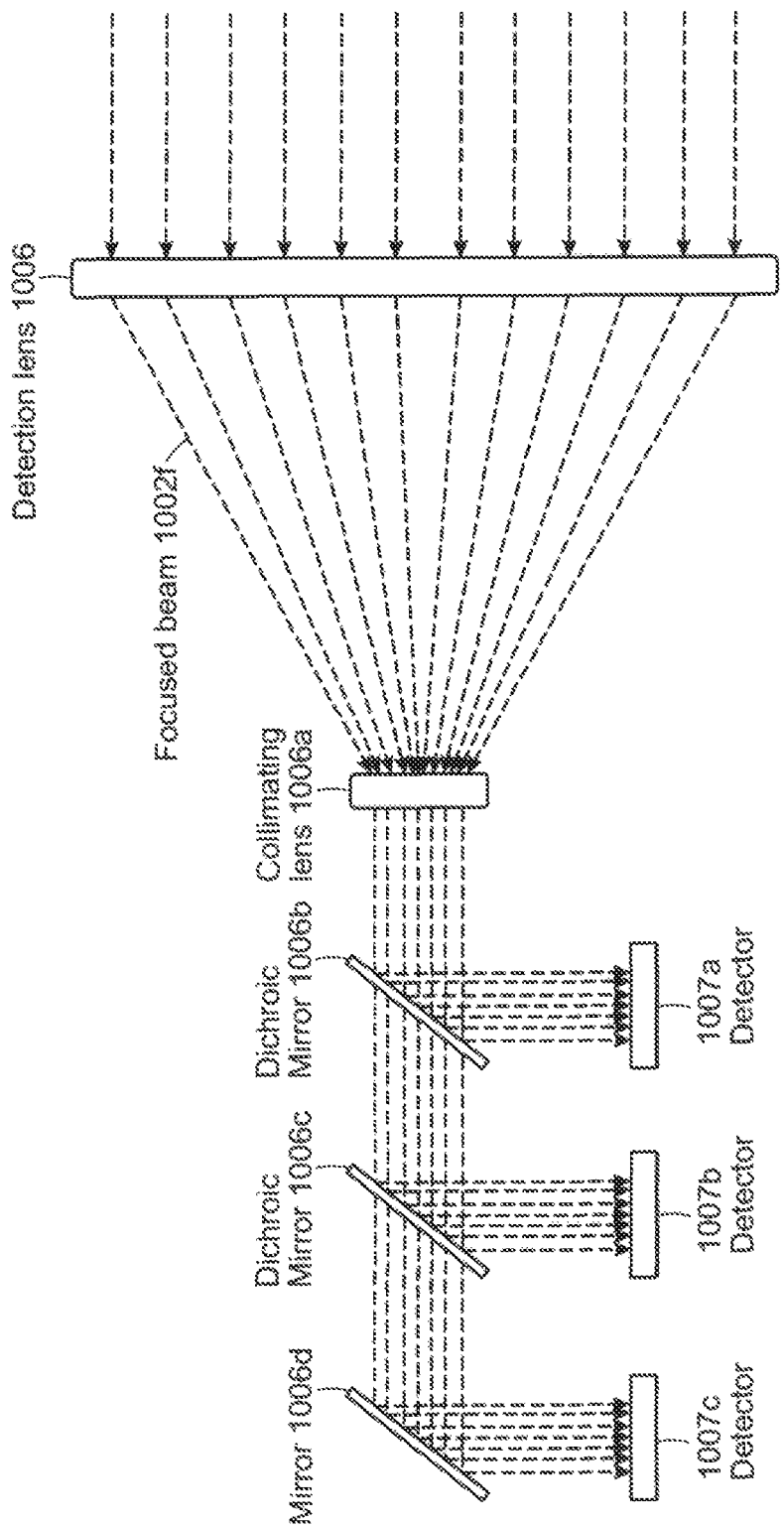
FIG. 10 is an example assembly of multiple detectors each featuring maximal sensitivity at a single or a range of light wavelengths, where a collimation step follows the detection lens.
Figure 11:
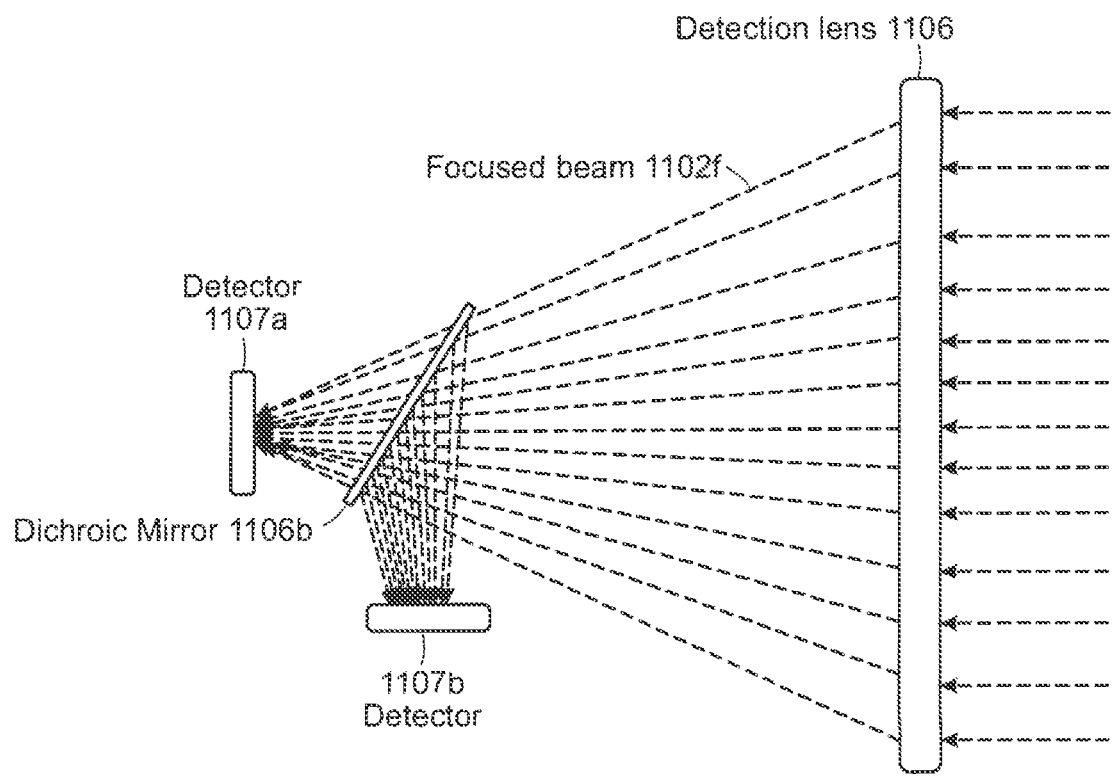
FIG. 11 is an example assembly of multiple detectors each featuring maximal sensitivity at a single or a range of light wavelengths, where a collimation step is eliminated.

Upon the application of varying light sources it might be preferred to apply different detectors each with maximal sensitivity at a corresponding light wavelength. In such cases a similar arrangement as that shown in FIG. 9 can be adopted. Two such examples are shown in FIGS. 10 and 11. In the arrangement of FIG. 10 the focused light 1002f is first collimated by a collimating lens 1006a and guided towards dichroic mirrors 1006b and 1006c each featuring a suitable characteristic wavelength. Each of the detectors 1007a, 1007b and 1007c operate with maximum efficiency near a specific wavelength. It is understood that such arrangement can be extended to any number of detectors. In another form one might be able to avoid using a collimation step and cascade dichroic mirrors following the detector lens. One such arrangement is shown in FIG. 11 where a dichroic mirror 1106b guides the focusing light beam 1102f to the corresponding detector 1107a or 1107b. It is understood that this arrangement can be extended to multiple detectors.

Figure 12:
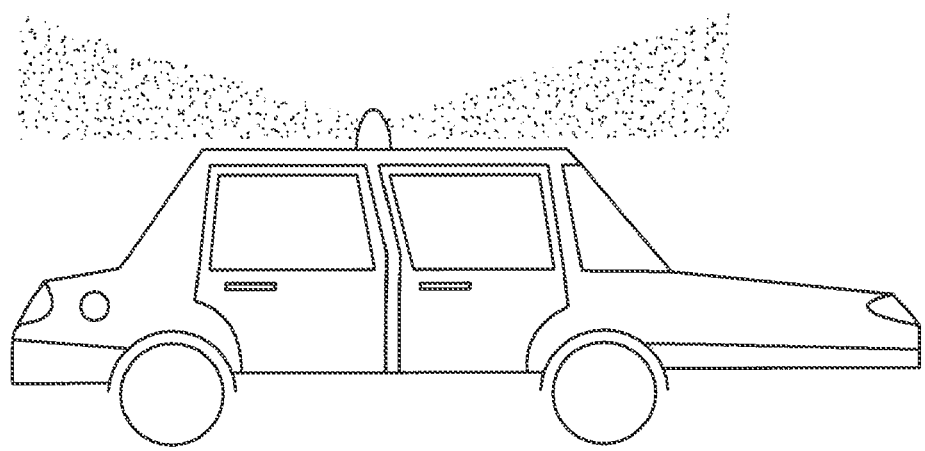
FIG. 12 is an example application of the LiDAR device, placed on the roof of an automobile, where the field of view of the instrument is 360 degrees along at least one direction.

In some of the embodiments discussed so far the field of view of the LiDAR in one direction can potentially be 360 degrees. In such embodiments the LiDAR device can be mounted on the body of a machine in such a way that the LiDAR surrounding is not blocked. An example is shown in FIG. 12 where the LiDAR device is mounted on the roof of an automobile.

Figure 13A:
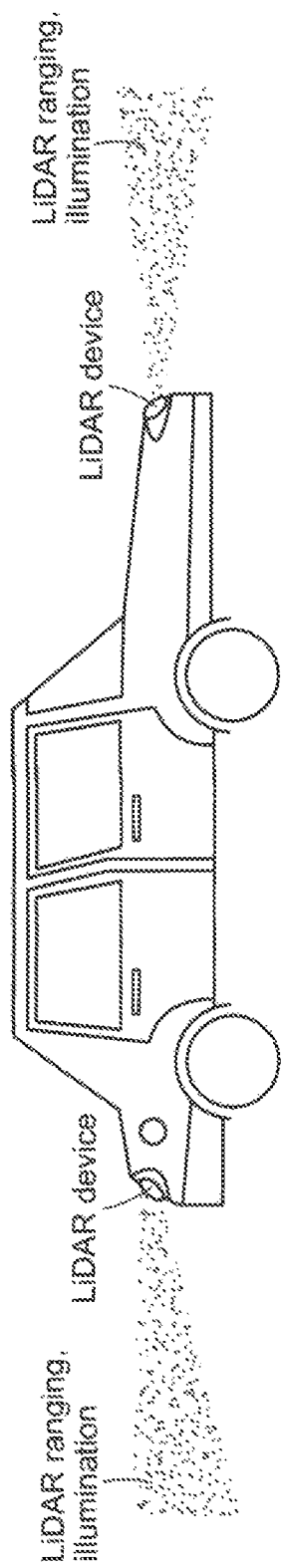
FIG. 13 a) is an example application of the LiDAR device where it is placed at an enclosure of a head/taillight of an automobile and used for ranging as well as illuminating the environment.
Figure 13B:
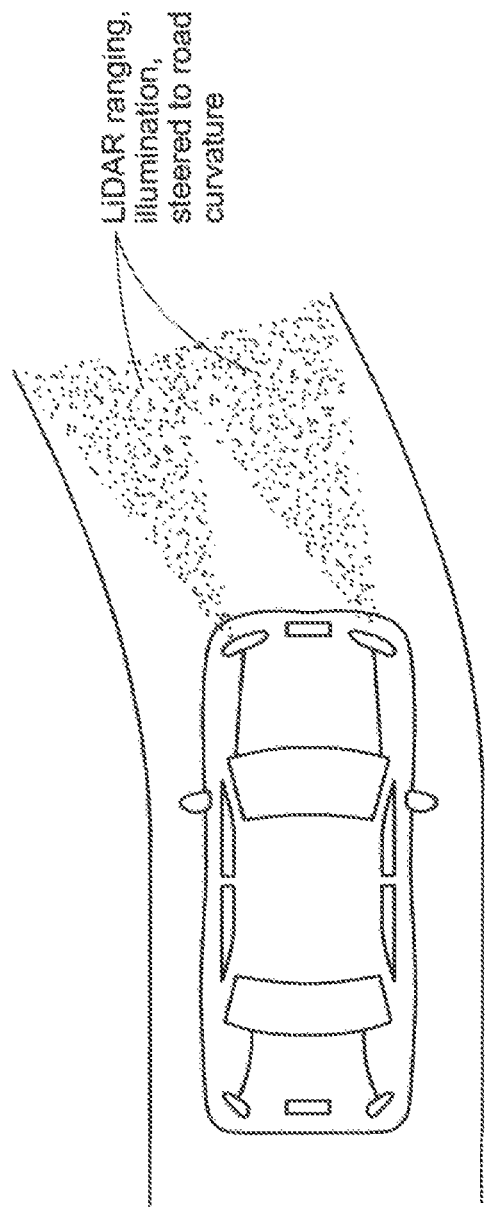
Figure 13C:
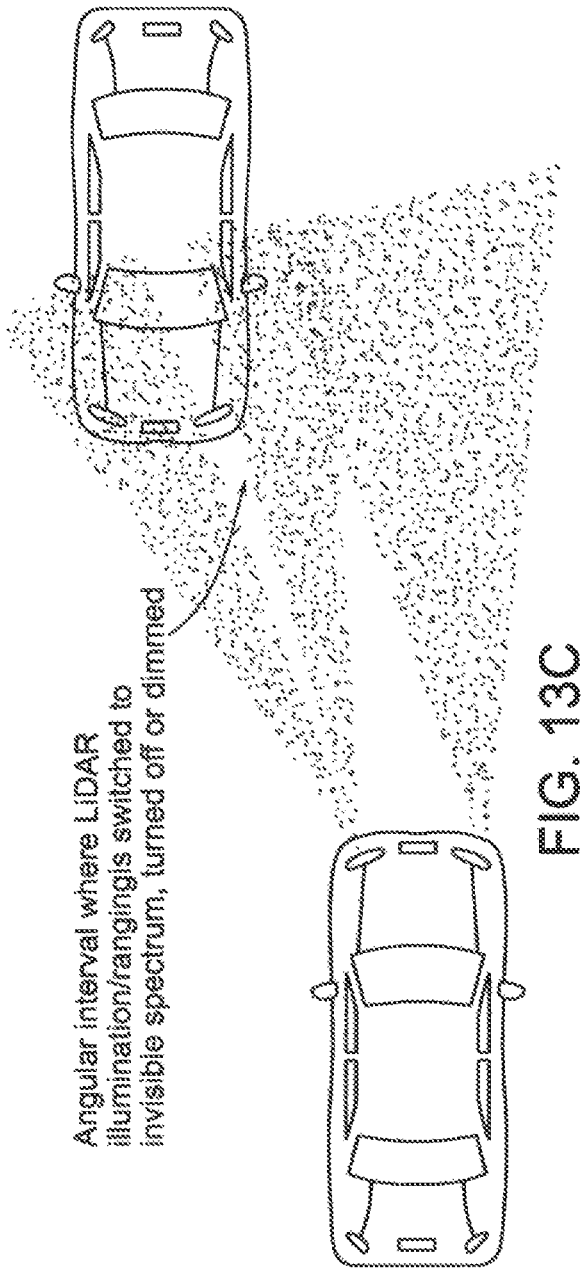
Figure 13D:
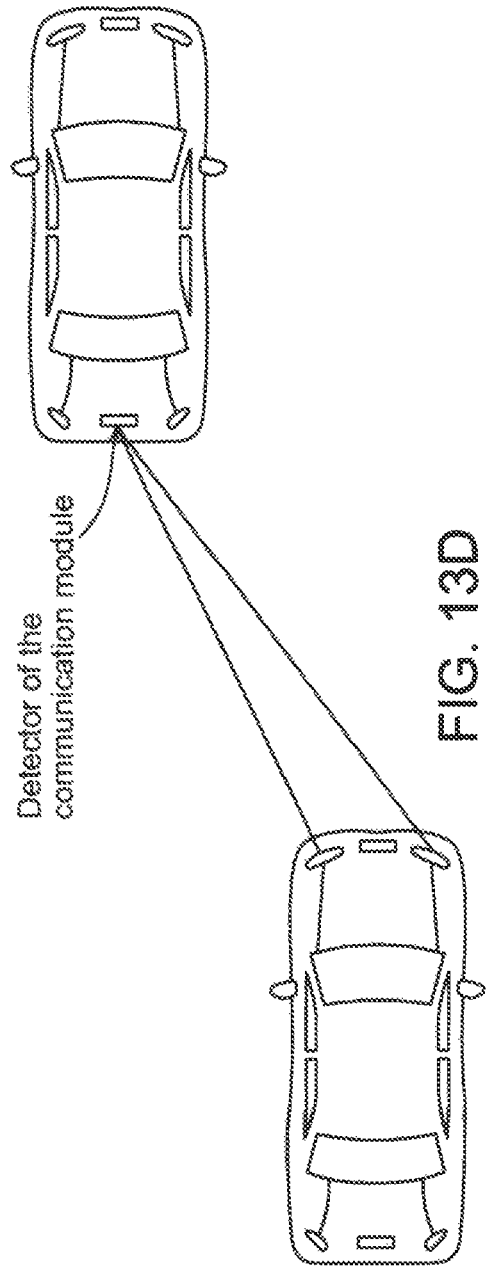

In other examples the field of view of the LiDAR is limited in two separate directions for example determined by the maximum angular rotation of the mirror components of the SMA unit. In such cases the LiDAR device can be placed in such a way that the frontal view of the LiDAR is not blocked. In one example shown in FIG. 13a the LiDAR device can be placed in the headlight or taillight enclosure of an automobile. It is understood that in such arrangement it is possible to apply visible spectrum for the lighting used in the LiDAR device to serve both purposes of illuminating the environment as is conventionally done by head/taillights and at the same time use the same lighting source for ranging as is done in the LiDAR device described in this invention. It is also understood that in such arrangement it is possible to turn the light source on or off, or modulate the intensity of the light when needed at certain transmission angles determined by the instantaneous rotation angle of various rotating components of the LiDAR device such as the SMA mirror components. One example where such capability can be useful is on road turns where light steering can help improve road and obstacle visibility. This is shown in FIG. 13b. In another example where such capability is useful is to fully control the illuminated area to avoid imposing glare on other drivers. In this case it is possible to illuminate all the objects and incoming cars except areas where other drivers are perceived to be present and potentially affected by glare. This is shown in FIG. 13c where a visible light spectrum is used both for ranging and illumination of the environment, e.g., at night. On the left headlight the light source is switched to an invisible spectrum, i.e., infrared, or dimmed/turned off for angular intervals where illumination is believed to be potentially dangerous to other drivers. In another example, shown in FIG. 13d the LiDAR device is also used as a high throughput and reliable means of communication between vehicles. The same laser beam applied for ranging can be used to transfer information to other vehicles such as ranging information to mutually improve the localization and collision avoidance performance of other vehicles. This extension of the invention opens up other possibilities in tourism and entertainment to name a few.

Figure 14A:
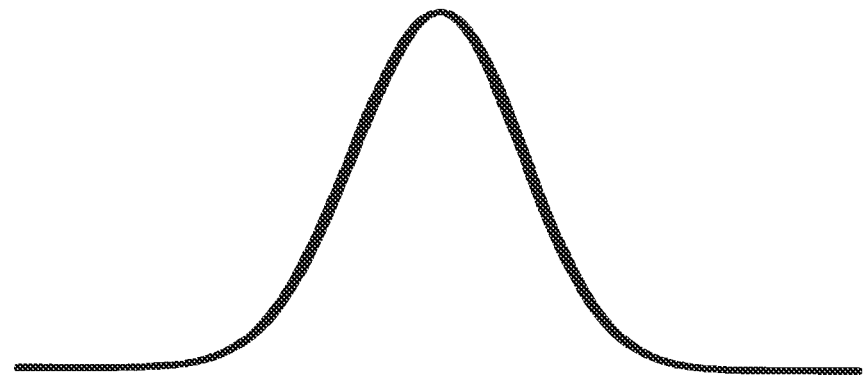
FIG. 14 *a*) shows the power modulation curve in a conventional LiDAR device.

The density of the point cloud acquired by the LiDAR device is very important in various tasks such as localization, perception, path planning, collision avoidance, etc. However, application of a limited number of light sources and a limited number of sensors puts a limit on the achievable point cloud density. One factor that limits the point cloud density is the ambiguity associated with multiple returns at high pulsing rates. Consider a case where the maximum ranging distance of interest is 300 m. There is a 2 μs time of flight associated with this distance. As such, for a light pulsing with a time interval shorter than 2 μs, multiple reflections may be received by the detector leading to ambiguity on the correct determination of the associated light pulse. FIG. 14a shows the variations of the light source output power associated with a conventional light pulse where the light source is off for a certain period of time before it is driven to a peak power and again back to virtually zero power. To avoid any ambiguity, in the conventional systems one needs to limit the throughput of the LiDAR device or use multiple light sources and detectors. One aspect of this invention addresses this limitation as further discussed in the following.

Figure 14B:
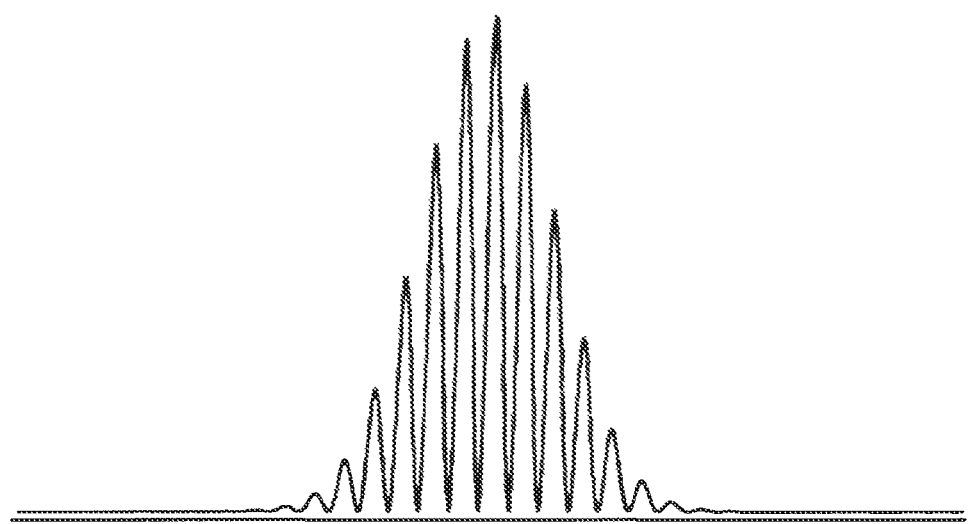

In one example of the LiDAR device presented in this invention the power associated with the light pulses are modulated at a distinct frequency. The resulting output power resembles a wavelet as shown in FIG. 14b. The modulation frequency assigned to each pulse can be used by a signal processing module in order to find the correct pairing between the reflections and the issued pulses. Another benefit of the power modulation is significant improvement in signal-to-noise ratio as the out-of-band noises and interferences can be easily removed.

FIG. 15a demonstrates an example of a flowchart of the Light Transmission and Detection module (LTD) of the LiDAR device. In one embodiment of the LTD module shown in FIG. 15b the modulation frequency is changed consecutively between several discrete frequencies $f_1 \ldots$, $f_N$, in a circularly periodic fashion where N is selected depending on the maximum possible number of returns in between two consecutive light transmissions. A timer, CLK (counter) T resets to zero upon each pulsing and increases to a maximum of $T_p$ when the next pulse is issued. The detector signal passes through a bank of bandpass filters including N filters $B_1, \ldots, B_N$ each with a center frequency set to the modulation frequencies $f_1 \ldots, f_N$. Each bandpass channel is followed by a comparator to detect the channel number that reflects an energy increase beyond a set threshold, E. It is noted that multiple channels can be detected simultaneously when the detected returns overlap in time. The time of flight, $T_F$, associated with every detected reflection can then be calculated according to the following equation:

$$T_f = \begin{cases} (n-m)T_p + T_c & \text{if } m < n \\ (N+1+n-m)T_p + T_c & \text{if } m > n \end{cases} \quad (1)$$

where m is the detected bandpass channel number, n is the count number associated with the latest issued light pulse featuring frequency $f_n$, $T_p$ is the time interval in between two issued light pulses, $T_c$ is the instantaneous timing of the timer CLK and N is the total number of discrete frequencies.

Through examples, various components and operation methods of a LiDAR device is described which includes at least one scanning mirrors array (SMA) composed of several mirror components capable of rotating or oscillating about a single or multiple independent axes. It is shown that the light transmission and detection paths can at least partially be shared. Through examples it was also demonstrated that a single or multiple light sources and detectors can be used operating at multiple wavelengths. In such embodiments the transmission light wavelength can be changed depending on the requirements. Example embodiments demonstrated the application of the LiDAR device as headlight or taillight where it can be simultaneously used for ranging and for illumination of the environment, e.g., at night or at low visibility circumstances. In this example it was discussed that the wavelength or intensity of the projected light can further be modulated in certain cases as a function of the projection angle (or the instantaneous angle of the mirror components of an SMA unit) to avoid imposing glare on other drivers or to improve reflection detection in low visibility, rain, snow or fog. It was also discussed that the LiDAR device can be used in transmitting various information to other vehicles (or other carriers of proper detection equipment as part of another LiDAR device or independently).

It is understood that the designs and arrangements described herein are for exemplifying purposes only and do not intend to be limiting in any fashion. As such, it is clear to those skilled in the art that other arrangements achieved through combination or elimination of certain components, steps or methodologies described in this document can be applied instead. It is also understood that many of the methodologies and elements described herein can be used in isolation or in combination with other elements which may or may not be described here. It is also understood that the terminology used here are to facilitate description of various concepts and similarly are not intended to be limiting. Other arrangements and embodiments of the concepts described herein will be obvious to those skilled in the art. The true scope of this invention are listed in the following claims.

REFERENCES

1) G. Pennecot et al, Device and methods for a rotating LiDAR platform with a shared transmit/receive path, U.S. Pat. No. 8,836,922 B1, 2014.
2) D. S. Hall, High Definition LiDAR system, US 2011/0216304 A1, 2011.
3) W. Nakagawa, et al, Torsional vibrators and light deflectors using the torsional vibrator, 1993, U.S. Pat. No. 5,543,956
4) S. Kurth, et al, A novel 24 kHz resonant scanner for high resolution laser display, 2005, Proc. SPIE 5721, MOEMS Display and Imaging Systems III.
5) KAM Y. LAU, Narrow-Band Modulation of Semiconductor Lasers at Millimeter Wave Frequencies (>100 GHz) by Mode Locking, IEEE Journal of quantum electronics, Vol. 26. No. 2, 1990.
6) Aloysius Wehr, et al, Airborne laser scanning—an introduction and overview, ISPRS Journal of Photogrammetry & Remote Sensing 54, 68-82, 1992.

What is claimed is:

1. A light detection and ranging device comprising:
   a housing capable of rotating about an axis;
   at least one light source to generate a beam of light;
   a collimating lens to decrease a divergence angle of the beam of light;
   a mirror to guide the beam of light from the collimating lens onto a path at least partially shared by reflected light from a scene;
   a scanning mirrors array composed of several mirror components, wherein the scanning mirrors array comprises a first mirror component to reflect the beam of light at suitable angles toward the scene and a plurality of second mirror components to capture the reflected light at the same angles; and
   a detection lens to focus the reflected light captured by the scanning mirrors array on one or multiple detectors.

2. The LiDAR device of claim 1, where individual mirror components of the scanning mirrors array have a single degree of freedom, rotating about a single axis, to provide a line or curvature scan of the environment.

3. The LiDAR device of claim 1, where individual mirror components of the scanning mirrors array have two degrees of freedom, rotating about two independent axes, to provide a surface or 2D scan of the environment.

4. The LiDAR device of claim 1, where the mirror components of the scanning mirrors array are capable of reflecting light on both sides, the beam of light is a first beam of light that illuminates a first side of the first mirror component, and the at least one light source generates a second beam of light that illuminates a second side of the first mirror component while the first beam of light illuminates the first side of the first mirror component.

5. The LiDAR device of claim 1, further comprising:
   an additional monolithic mirror that is paired with the scanning mirrors array and is able to rotate about a single or multiple axis to provide additional scanning degrees of freedom.

6. The LiDAR device of claim 5, where the additional monolithic mirror is two sided enabling support of two replicas of the LiDAR device of claim 1 for increased throughput.

7. The LiDAR device of claim 1, where multiple scanning mirrors arrays are paired together or placed consecutively, wherein each scanning mirrors array provides an additional degree of freedom to scan the environment.

8. The LiDAR device of claim 1, where the at least one light source comprises a multitude of light sources each having a different operating wavelength or capable of operating at multiple wavelengths and coupled into the same light path via one or a multitude of wavelength selective mirrors.

9. The LiDAR device of claim 8, where the operating wavelength of the device can be selected as a function of weather conditions, nature of objects in the field of view, road conditions, angular position of the housing, and/or instantaneous angular position of the individual mirror components or the scanning mirrors array.

10. The LiDAR device of claim 8, where each of the one or more detectors has a highest sensitivity at one of the multitude of available light wavelengths and the reflected light is guided to a corresponding detector via one or multiple wavelength selective mirrors.

11. The LiDAR device of claim 10, where a detection lens responsible for focusing the reflected light is followed by a collimation lens.

12. The LiDAR device of claim 1, where the at least one light source is set to operate at a visible wavelength to simultaneously provide ranging and illumination of the environment.

13. The LiDAR device of claim 12, where the LiDAR device is used as a headlight or taillight in an automobile.

14. The LiDAR device of claim 13, where the wavelength of the at least one light source is within the visible spectrum at certain angular positions to increase road visibility in turns.

15. The LiDAR device of claim 12, where the wavelength of the at least one light source is switched from the visible wavelength to an invisible wavelength for specific instantaneous rotation angles of the housing or the mirror components of the scanning mirrors array.

16. The LiDAR device of claim 12, where the intensity of the light source is changed for specific instantaneous rotation angles of the housing or the mirror components of the scanning mirrors array.

17. The LiDAR device of claim 1, where the beam of light has an intensity modulated at one or a multitude of frequencies to enable unambiguous calculation of the range, improve signal to noise ratio, and/or achieve a high density point cloud.

18. The LiDAR device of claim 17, further comprising a bank of bandpass filters followed by comparators for reflection detection.

19. The LiDAR device of claim 18, further comprising ranging circuitry to calculate ranges associated with the reflected light according to:

$$T_F = \begin{cases} (n-m)T_p + T_c & \text{if } m < n \\ (N+1+n-m)T_p + T_c & \text{if } m > n \end{cases},$$

where $T_F$ is a time of flight, m is a number of a bandpass channel, n is a count number associated with a latest light pulse featuring frequency $f_n$ in the beam of light, $T_p$ is a time interval in between light pulses in the beam of light, $T_c$ is an instantaneous timing of a timer in the ranging circuitry, and N is a total number of discrete frequencies used to modulate the beam of light.

20. The LiDAR device of claim 1, where the scanning mirrors array includes actuators and sensors to change the angular position of individual mirror components and to precisely measure their instantaneous angular position.

21. The LiDAR device of claim 1, where the light source is set to operate at a wavelength suitable for adverse weather conditions.

22. The LiDAR device of claim 1, where the LiDAR device is configured to transfer information to other vehicles via projected laser light.

23. The LiDAR device of claim 1, where the mirror components in the scanning mirrors array are configured to operate as resonance scanners oscillating about a stable angular point at a resonance frequency of the scanning mirrors array.

24. The LiDAR device of claim 1, where the one or more detectors have areas sized to accommodate discrepancies in the instantaneous rotation angles of the mirror components in the scanning mirrors array.

* * * * *